United States Patent [19]

Maskas et al.

[11] Patent Number: 5,029,074
[45] Date of Patent: Jul. 2, 1991

[54] BUS ADAPTER UNIT FOR DIGITAL PROCESSING SYSTEM

[75] Inventors: Barry Maskas, Marlboro; Jesse Lipcon, Harvard, both of Mass.

[73] Assignee: Digital Equipment Corporation, Maynard, Mass.

[21] Appl. No.: 474,202

[22] Filed: Jan. 23, 1990

Related U.S. Application Data

[63] Continuation of Ser. No. 67,835, Jun. 29, 1987, abandoned.

[51] Int. Cl.$^5$ .............................................. G06F 3/00
[52] U.S. Cl. .................................... 364/200; 364/240; 364/240.2
[58] Field of Search ... 364/200 MS File, 900 MS File

[56] References Cited

U.S. PATENT DOCUMENTS

| | | | |
|---|---|---|---|
| 4,038,644 | 7/1977 | Duke et al. | 364/900 |
| 4,041,472 | 8/1977 | Shah et al. | 364/900 |
| 4,128,883 | 12/1978 | Duke et al. | 364/200 |
| 4,205,373 | 5/1980 | Shah et al. | 364/200 |
| 4,286,319 | 8/1981 | Membrino | 364/200 |
| 4,323,967 | 4/1982 | Peters et al. | 364/200 |
| 4,527,236 | 7/1985 | Ermolovich | 364/200 |
| 4,549,263 | 10/1985 | Calder | 364/200 |
| 4,570,220 | 2/1986 | Tetrick | 364/200 |
| 4,819,154 | 4/1989 | Stiffler et al. | 364/200 |
| 4,831,520 | 5/1989 | Rubinfeld et al. | 364/200 |

FOREIGN PATENT DOCUMENTS

| | | |
|---|---|---|
| 0226096 | 6/1987 | European Pat. Off. . |
| 2538140 | 6/1984 | France . |
| 2128853 | 5/1984 | United Kingdom . |
| 8603607 | 2/1986 | World Int. Prop. O. . |

*Primary Examiner*—Gary V. Harkcom
*Assistant Examiner*—Michael A. Jaffe
*Attorney, Agent, or Firm*—Fish & Richardson

[57] ABSTRACT

A digital data processing system includes a plurality of processing subsystems, each including an adapter for enabling transfers between the resident subsystem and other subsystems. The adapter includes a master section which enables transfers of data initiated by the subsystem between the input/output bus and the higher level communications mechanism, a slave section which enables transfers of data between the higher level communications mechanism and the input/output bus initiated by another subsystem and an interprocessor communications mechanism for enabling the subsystem and other subsystems to communicate to thereby enable the other subsystems to perform control operations in connection with the subsystem.

34 Claims, 5 Drawing Sheets

FIG. 1

FIG. 2A
LOCAL BUS 15

FIG. 2B
SYSTEM BUS 11

BUS ADAPTER UNIT FOR DIGITAL PROCESSING SYSTEM

This is a continuation of copending application Ser. No. 07/067,835 filed on June 29, 1987, now abandoned.

BACKGROUND OF THE INVENTION

1. Field of the Invention

The invention relates generally to the field of digital data processing systems and more specifically to bus communications adapters for facilitating communications between buses in such systems.

2. Description of the Prior Art

A typical digital data processing (that is, computer) system includes three basic elements, namely a processor element, a memory element, and an input/output element. The memory element stores information in addressable storage locations. This information includes both data and instructions for processing the data. The processor element includes one or more digital data processing units, or "processors", each of which causes information to be transferred, or fetched, to it from the memory element, interprets the incoming information as either instructions or data, and processes the data in accordance with the instructions. The results are then stored in addressed locations in the memory element.

The input/output element also communicates with the memory element in order to transfer information into the system and to obtain the processed data from it. Typical units comprising the input/output element include, for example, printers, teletypewriters, and video display terminals, and may also include secondary information storage devices such as disk or tape storage units. Units comprising the input/output element normally operate in accordance with control information supplied to it by the processor element. The control information defines the operation to be performed by the input/output unit. At least one class of operations performed by an input/output unit is the transfer of user information, that is, information used by a user program, between the input/output unit and the memory element.

In addition to functioning as input/output devices, disk storage units and, sometimes, tape storage units may also function as part of the memory element. In particular, a memory element typically includes a main memory, whose contents are accessible to the processor relatively quickly but which is generally relatively high-cost storage. Modern main memories are typically implemented using MOS or bipolar semiconductor technology and may provide on the order of a fraction of a megabyte to several tens of megabytes of storage.

In the past a digital data processing system typically was large and expensive. Typically, systems included one processor, a memory and several input/output units, all interconnected by one or more buses. To increase processing speed, several computer systems were designed to include one or only a few additional processors which normally shared memory and input/output units.

However, with the advent of minicomputers, several systems were developed, primarily although not exclusively for research purposes, which included a larger number, that is, on the order of ten or more, of processors effectively connected in clusters to form a multiprocessing system. Clustering has continued with microprocessors. In a clustered system, typically each processor is part of a subsystem which itself is a complete digital data processing system, including an associated local memory and, in most cases, one or more input/output devices, all of which are connected to an input/output bus of the minicomputer or microprocessor. The various subsystems are interconnected through a higher level communications mechanism to permit the processors in the various subsystems to communicate with each other and to access memory and use input/output units which may be physically part of other subsystems. Generally, each processor's input/output bus is connected to the higher level communications mechanism through a bus adapter. This permits transfers to take place over the input/output buses in the various subsystems at the same time, which would not be permissible if all of the subsystem's input/output buses were connected directly together. Only if a processor in one subsystem needs to communicate with another subsystem does a transfer take place over the higher level communications mechanism. Efficient operation of the clustered system, as a whole, requires an efficient communication mechanism between each of the subsystems and the higher level communications mechanism, particularly if it is desired to allow the various subsystems to share each others' memories and input/output units.

SUMMARY OF THE INVENTION

The invention provides a new and improved adapter for facilitating communications between an input/output bus in a subsystem of a multiprocessing system including a plurality of subsystems and a higher level communications mechanism which facilitates communications among said subsystems.

In brief summary, the new adapter includes a master section which enables transfers of data initiated by the subsystem between the input/output bus and the higher level communications mechanism, a slave section which enables transfers of data between the higher level communications mechanism and the input/output bus initiated by another subsystem and an interprocessor communications mechanism for enabling the subsystem and other subsystems to communicate to thereby enable the other subsystems to perform control operations in connection with the subsystem.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4A through 4D-5 are diagrams showing various data structures useful in understanding the operation of the bus adapter depicted in FIG. 3.

DETAILED DESCRIPTION OF AN ILLUSTRATIVE EMBODIMENT

General Description

Figure 1:
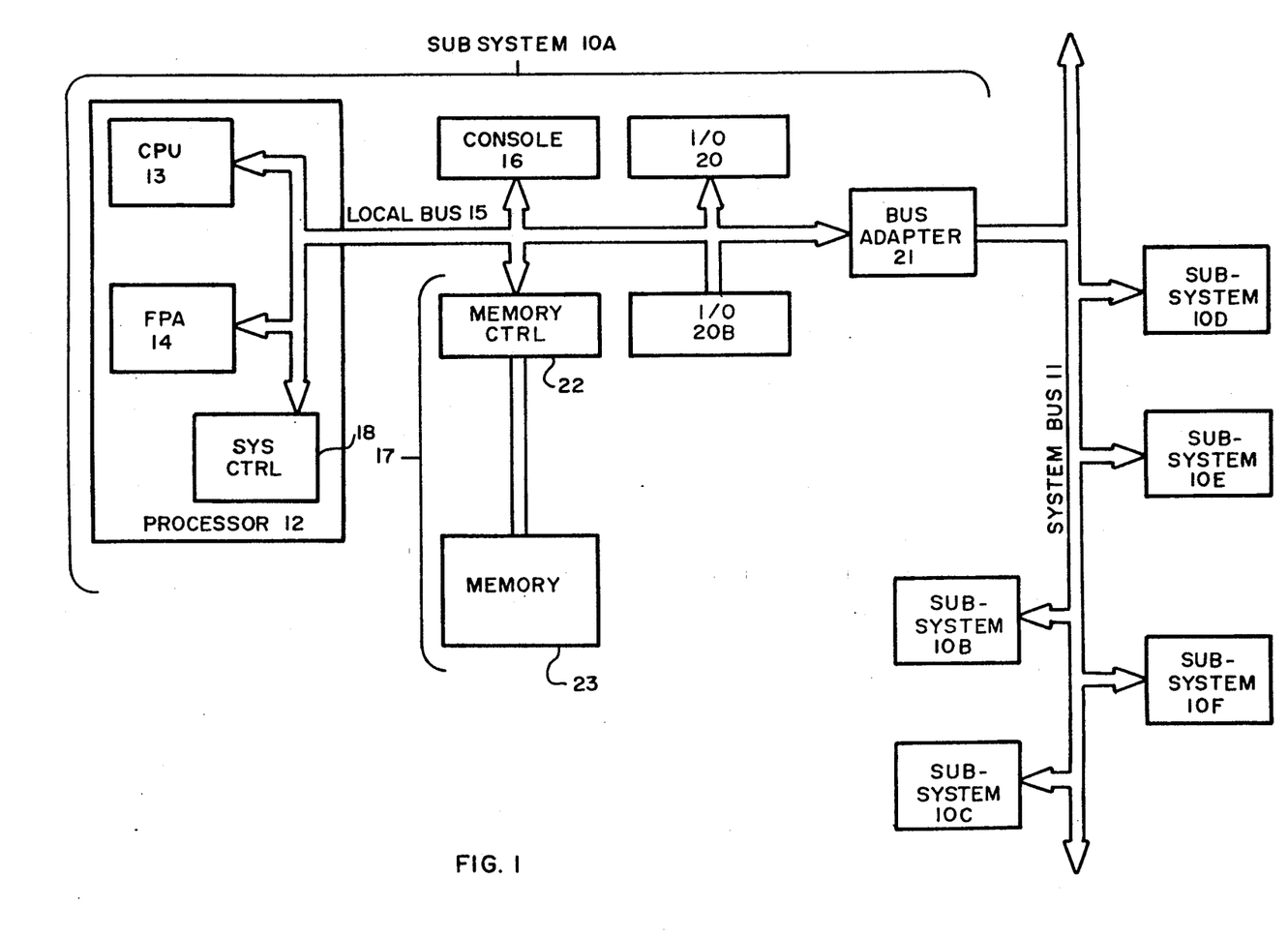
FIG. 1 is a general block diagram of a digital data processing system including the invention, the system including a plurality of individual digital data processing subsystems which are interconnected to form a multiprocessing system.

Referring to FIG. 1, a digital data processing system including the invention includes a plurality of subsystems 10A through 10F (generally identified by reference numeral 10) which are interconnected by a system bus 11. Since the subsystems 10 are generally similar, only subsystem 10A will be described in detail. Subsystem 10A includes a processor 12 which includes a central processing unit 13, a floating point accelerator processor 14, and a subsystem control unit 18 interconnected by a local bus 15. Local bus 15 serves as the input/output bus of the processor 12, and may effectively constitute the input/output bus of the central processing unit 13 which allows the central processing unit 13, floating point accelerator processor 14, and subsystem control unit 18 to communicate with other elements of the subsystem, which may include a console 16, a memory 17, one or more input/output units 20A and 20B (generally identified by reference numeral 20). In addition, a bus adapter 21 allows communications between local bus 15 and system bus 11. It will be appreciated that, while FIG. 1 depicts a system including six subsystems identified by reference numerals, 10A through 10F, a system constructed in accordance with the invention may include more or fewer subsystems.

The central processor unit 13 executes instructions that are stored in addressable storage locations in the memory 17 in the subsystem 10A or in corresponding memories in the other subsystems 10. The instructions identify operations that are to be performed on operands, which are also stored in addressable locations in the memory 17. The instructions and operands are fetched by the central processor unit 13 as they are needed, and processed data are returned for storage in the memory 17. The central processor unit 13 also transmits control information to the input/output units 20, and bus adapter unit 21, enabling them to perform selected operations, such as transmitting data to or retrieving data from the memory 17. Such data may include instructions or operands which may be transmitted to the memory 17 or processed data which is retrieved from the memory 17 for storage or display.

As is typical, the floating point processor is an option and need not be present in a digital data processing system or processor 12 constructed in accordance with the invention. The floating point processor 14 includes circuits which are optimized for processing instructions on selected types of data, namely data in floating point formats. Typically, the central processor unit 13 can process the same data, but it requires more time to perform the processing.

The subsystem control circuit 18, under control of the central processor unit 13, performs arbitration operations thereby regulating access of the various input/output units 20 and the bus adapter 21 to the local bus 15.

An operators console 16 serves as the operator's interface. It allows the operator to examine and deposit data, halt the operation of the central processor unit 13 or step the central processor unit 13 through a sequence of instructions and determine the responses of the central processor unit 13 in response thereto. It also enables an operator to initialize the system through a boot strap procedure, and perform various diagnostic tests on the entire data processing system.

A subsystem 10 may include several types of input/output units 20, including disk and tape secondary storage units, teletypewriters, video display terminals, line printers, telephone and computer network interface units, and the like. The memory 17 includes a memory controller 22, which is connected directly to the local bus 15 and to a plurality of arrays 23. The arrays 23 contain a plurality of addressable storage location in which information is stored. The memory controller 22 receives transfer requests from the central processor unit 13, an input/output unit 20, or the bus adapter 21 over the local bus 15. Several types of transfer requests may be transmitted over local bus 15, which fall into two general categories. In one category, information is written into, or stored in, a storage location, and in the other category, information is retrieved, or read, from a storage location, the storage location being identified by an address transmitted with the transfer request.

Bus adapter 21, which will be described in more detail below in connection with FIG. 3, also receives transfer requests from local bus 15 and may, depending on the address transmitted during the transfer request, initiate a transfer operation over system bus 11. In a transfer operation over system bus 11, information may be transmitted to or requested from another subsystem 10 which is also connected to system bus 11. The bus adapter 21 in a subsystem 10 also receives transfer requests from other subsystems 10 over the system bus 11, performs either a write operation to transfer information to a storage location in its subsystem 10 or a retrieval operation to obtain the requested information and transfers the retrieved information over the system bus to the requesting subsystem 10. During a transfer operation over system bus 11 an address is also transmitted which identifies the storage location in which information is to be stored or from which information is to be retrieved. As will be explained below in connection with FIG. 3, the storage location identified by the address may be in any subsystem 10, including the subsystem which initiated the transfer. It will be appreciated that a transfer request which is performed by a bus adapter 21 over system bus 11 may be initiated only by the central processor unit 13. Input/output unit 20 operating in a direct memory access mode, in one subsystem 10 cannot transfer information to, or retrieve information from a memory 17 in another subsystem.

Operations Over Local Bus 15

Figure 2A:
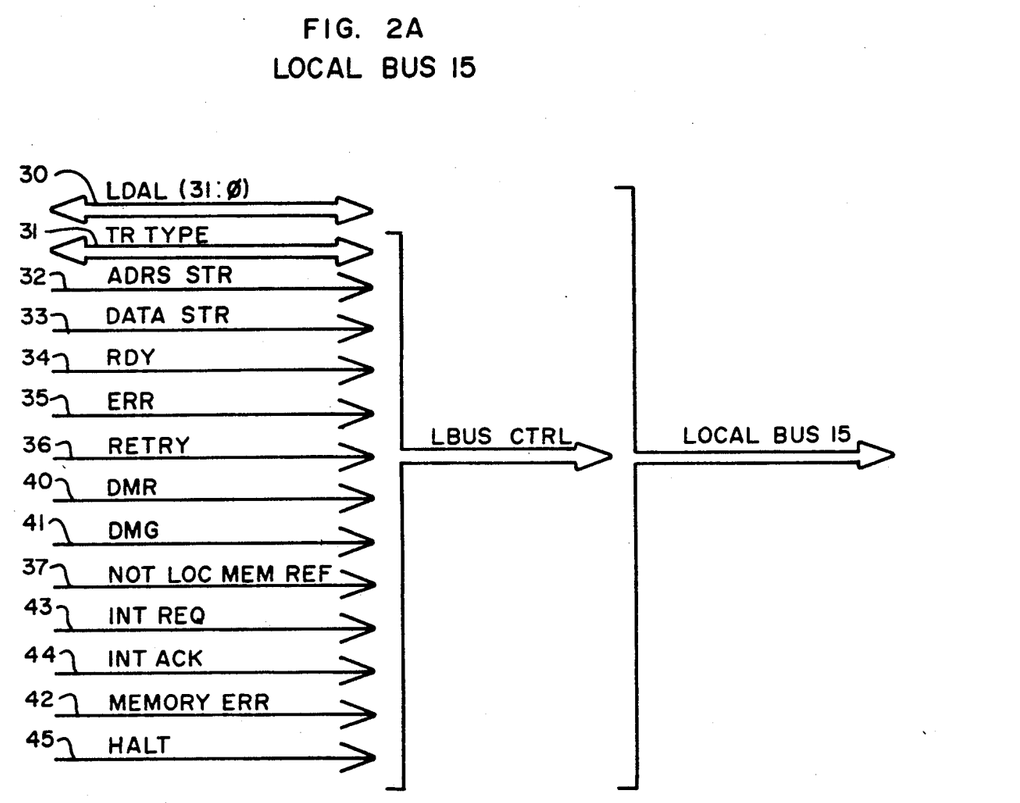
FIG. 2A is a diagram useful in understanding the transfer of information over a local bus interconnecting elements of an individual subsystem in the system depicted in FIG. 1.

The local bus 15 includes a number of lines, depicted in detail in FIG. 2A, for transferring signals representing information among the various units connected to it. With reference to FIG. 2A, local bus 15 includes LDAL (31:0) local data/address lines 30, which carry L DAT local data and L ADRS local address signals. If a unit is initiating a transfer, making it the bus master for the transfer, it first transmits the L ADRS local address signals representing a thirty-two bit local address over the LDAL (31:0) local data/address lines and contemporaneously transmits TR TYPE (3:0), transfer type command signals on lines 31, which indicate whether the transfer operation is a read or a write operation. A short time later, sufficient to allow the L ADRS local address signals and TR TYPE (3:0) transfer type command signals to settle, the bus master then asserts an ADRS STR address strobe signal on a line 32.

When the ADRS STR address strobe signal is asserted, all of the other units connected to bus 13 receive and decode the L ADRS local address and TR TYPE (3:0) transfer type command signals, with the unit containing the location identified by the L ADRS local address signals being the responding unit, or slave, for the transfer. A selected time after the ADRS STR address strobe signal is asserted, the bus master removes the L ADRS local address signals and TR TYPE (3:0) transfer type command signals from the respective lines 30 and 31.

If the transmitted TR TYPE (3:0) transfer type command signals define a write operation, the bus master unit then transmits L DAT local data signals representing a thirty-two bit word of digital data over the LDAL (31:0) local data/address lines/address lines 30, and then asserts a DATA STR data strobe signal on a line 33. The slave unit then receives and stores the transmitted data. When the data has been stored, the addressed unit then asserts a RDY ready signal on a line 34 if the operation is completed without error, an ERR error signal on a line 35 if an error occurred during the storage operation, or a RETRY signal on a line 36 if the slave unit is busy and unable to complete the transfer operation. In addition, if the slave unit is the memory 17, that is, if the L ADRS local address signals identify an address which is allocated to the memory 17, but if the L ADRS local address signals identify a storage location in memory 17 which does not exist, the memory 17 asserts a NOT LOC MEMORY REF not local memory reference signal on a line 37.

If, on the other hand, the transmitted TR TYPE (3:0) transfer type command signals define a read operation, the slave unit retrieves the data from the location identified by the address signals, transmits them as L DAT local data signals representing a thirty-two bit word of digital data over the LDAL (31:0) local data/address lines/address lines 30, and transmits an asserted RDY ready signal over line 34. In response, the master unit receives the data and transmits an asserted DATA STR data strobe signal over line 33. If an error occurred during the retrieval or if the slave unit is unable to complete the transfer because it is busy, in response to the assertion of the DATA STR data strobe signal on line 33, the slave unit asserts the ERR error signal or RETRY signal, respectively, instead of the RDY ready signal. In addition, if the slave unit is the memory 17 and if the L ADRS local address signals identify a storage location in memory 17 which does not exist, the memory 17 asserts a NOT LOC MEMORY REF not local memory reference signal on a line 37.

In either a read or a write operation, after the slave has asserted the RDY ready signal, the ERR error signal if an error occurred during the transfer, or the RETRY signal if the slave is busy and unable to complete the transfer, the master unit negates the DATA STR data strobe signal. The slave unit then negates the RDY ready, ERR error or RETRY signal, and then the master unit negates the ADRS STR address strobe signal to complete the transfer.

Units connected to local bus 15 other than central processor unit 13 may constitute bus masters and initiate transfers over local bus 15. The input/output units 20 and bus adapter 21 may become bus master. The input/output units 20 may become bus master to initiate read or write operations over local bus 15 with its local memory 17 but not through bus adapter 21 to memories of other subsystems 10 connected to system bus 11. In addition, the bus adapter 21 may become bus master to initiate read or write operations over local bus 15 to transfer information to or from memory 17, but not to input/output units 20. To become bus master, input/output unit 20 and bus adapter 21 asserts a DMR direct memory request signal on a line 40. The subsystem control circuit 18 then asserts a DMG direct memory grant signal on a line 41. Each unit which may perform a direct memory access transfer, including input/output unit 20 and bus adapter 21 in a subsystem 10 depicted in FIG. 1 has a separate DMR direct memory request signal line 40 to subsystem control circuit 18. In response to the receipt of an asserted DMR direct memory request signal from a requesting unit, the subsystem control circuit transmits an asserted signal on a DMG direct memory grant signal line 41 to a requesting unit to enable it to make a transfer over local bus 15. If more than one unit is a requesting unit, the subsystem control circuit 18 selects one requesting unit to make the transfer. A unit, after receiving an asserted DMG direct memory grant signal, performs a transfer over local bus 15 as described above.

In addition, local bus 15 includes several lines used by various units in a subsystem 10 to initiate interrupt service from the central processor unit 13. The memory 17 may request interrupt service by asserting a MEMORY ERR memory error signal on a line 42. Other units, including the input/output units 20 and bus adapter 21 may request interrupt service by asserting an INT REQ interrupt request signal on a line 43. In response to the receipt of an asserted INT REQ interrupt request signal, the central processor unit 13, at times which are conventional in the art, transmits an asserted INT ACK interrupt acknowledgement signal on a line 44. Line 44 is daisy-chained through the units which may assert the INT REQ interrupt request signal. If a unit receives the asserted INT ACK interrupt acknowledgement signal, and if it is not asserting the INT REQ interrupt request signal, the unit passes the asserted INT ACK interrupt acknowledgement signal over the daisy-chained line 44 to the next unit in the chain. If, on the other hand, the unit receiving the asserted INT ACK interrupt acknowledgement signal is asserting the INT REQ interrupt request signal, it effectively blocks the INT ACK interrupt acknowledgement signal and does not pass it to the next unit in the chain. The central processor unit 13 then performs a read operation over the local bus 15 with the TR TYPE (2:0) signals conditioned to indicate an interrupt acknowledgement type read operation, and the unit blocking the INT ACK interrupt acknowledgement signal transmits an interrupt vector to the central processor unit 13. The central processor unit 13 uses the interrupt vector to identify an interrupt service routine which it uses to service the interrupt request.

Operations Over System Bus 11

Figure 2B:
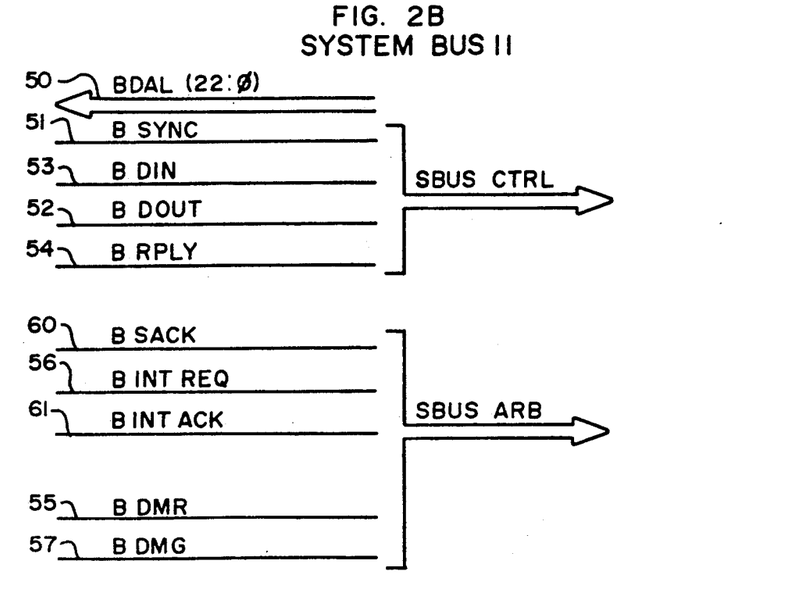
FIG. 2B is a diagram useful in understanding the transfer of information over a system bus interconnecting subsystems in the system depicted in FIG. 1.

The system bus 11 also includes a number of lines, depicted in detail in FIG. 2B, for transferring signals representing information among the various subsystems connected to it. With reference to FIG. 2B, system bus 11 includes BDAL (21:0) system data/address lines 50, which carry S DAT system data and S ADRS system address signals. The protocol used to transfer information over system bus 11 is similar to the protocol used to transfer information over the local bus 15 as described above. If a subsystem, in particular its bus adapter 21, is initiating a transfer, making it the system bus master for the transfer, it first transmits the S ADRS system address signals representing a twenty-two bit system address over the BDAL (21:0) system data/address lines and, a short time later, sufficient to allow the S ADRS system address signals to settle, it then asserts a B SYNC bus synchronization signal on a line 51.

When the B SYNC bus synchronization signal is asserted, all of the other units connected to system bus 11 receive and decode the S ADRS system address signals, with the unit containing the location identified by the S ADRS system address signals being the responding unit, or system bus slave, for the transfer. A selected time after the B SYNC bus synchronization signal is asserted, the system bus master removes the S ADRS system address signals from the lines 50.

If the operation over system bus 11 is to be a write operation, the bus adapter 21 which comprises the system bus master then transmits S DAT system data signals representing a sixteen bit word of digital data over sixteen of the twenty-two the BDAL (21:0) system data/address lines 50, and then asserts a B DOUT bus data out strobe signal on a line 52. The bus adapter 21 which comprises the system bus slave then receives and stores the transmitted data. To acknowledge receipt of the data signals has been stored, the addressed unit then asserts a B RPLY bus reply signal on a line 54.

If, on the other hand, the operation over system bus 11 is to be a read operation, the bus adapter 21 which comprises the system bus master then asserts a B DIN bus data in signal on a line 53. In response, the bus adapter 21 which comprises the system bus slave retrieves the data from the location identified by the S ADRS system address signals, transmits them as sixteen S DAT system data signals representing a sixteen bit word of digital data over sixteen of the twenty-two BDAL (21:0) system data/address lines 50, and asserts the B RPLY bus reply signal on line 54.

In either a read or a write operation, after the system bus slave has asserted the B RPLY bus reply signal on line 54, the system bus master negates the B DIN bus data in or B DOUT bus data out signal which had previously been asserted. The system bus slave then negates the B RPLY bus reply signal, and the system bus master negates the B SYNC bus synchronization signal to complete the transfer.

The system bus 11 also allows a block transfer mode in either a read or write operation, in which the system bus master transmits one system bus address and transmits or receives a plurality of successive data words. If at the end of a transfer, a system bus master does not negate the B SYNC bus synchronization signal on line 51, but instead for a second time asserts, in connection with a read operation, the B DIN bus data in signal on line 53 or, in connection with a write operation, the B DOUT bus data out signal on line 52, a second read or write operation is enabled. As with the previous data word transfer, contemporaneous with the assertion of the B DOUT bus data out signal on line 52, the system bus master transmits S DAT system data signals over the BDAL (21:0) system data/address lines 50 representing another sixteen bit word of digital data, and in response to the assertion of the B DIN bus data in signal on line 53 the system bus slave couples S DAT system data signals onto the BDAL (21:0) system data/address lines 50 representing another sixteen bit word of digital data. During the second and subsequent transfers the address used by the system bus slave corresponds to the original system bus address, incremented by a number reflecting the number of previous transfers.

Any bus adapter 21 connected to system bus 11 may become system bus master. The bus adapter 21 of one subsystem 10 which is connected to system bus 11 operates as a bus arbiter, which permits other bus adapters to become system bus master through a bus arbitration procedure. To become system bus master, a bus adapter 21 asserts either a B DMR bus direct memory request signal on a line 55 if the prospective system bus master requires direct memory access with the memory 17 of a subsystem 10, or a B INT REQ bus interrupt request signal on a line 56 if the prospective system bus master requires interrupt service by the central processor unit 13 of the subsystem 10 whose bus adapter 21 operates as the system bus arbiter.

In response to an asserted B DMR bus direct memory request signal, the bus adapter 21 which operates as the bus arbiter asserts a B DMG bus direct memory grant signal on a line 57, which is daisy-chained through the other bus adapters 21 connected to system bus 10. The first bus adapter 21 along the daisy chained line 57 which is asserting the B DMR bus direct memory request signal becomes bus master. It blocks continuation of the B DMG bus direct memory grant signal on line 57 and asserts a B SACK bus selection acknowledgement signal on a line 60 to notify the bus adapter operating as the bus arbiter that it is acknowledging bus mastership and negates the B DMR signal on line 55. Thereafter, the bus adapter 21 which is the bus master performs a transfer over system bus 11 as described above, and then negates the B SACK bus selection acknowledgement signal to permit the bus adapter 21 which operates as the bus arbiter to perform another bus arbitration operation.

Similarly, in response to an asserted B INT REQ bus interrupt request signal, the bus adapter 21 which operates as the bus arbiter asserts a B INT ACK bus interrupt grant signal on a line 61, which is daisy-chained through the other bus adapters 21 connected to system bus 10. The first bus adapter 21 along the daisy chained line 61 which is asserting the B INT REQ bus interrupt request signal comprises the bus master. It blocks continuation of the B INT ACK bus interrupt grant signal on line 61 and negates the B INT REQ signal on line 56. Thereafter, the bus adapter 21 which is the bus arbiter performs a read transfer over system bus 11, but does not assert B SYNC signal 51. In this case, the operation is a read operation to transfer interrupt information comprising an interrupt vector. After the interrupt information has been transferred, the bus arbiter negates the B INT ACK bus interrupt acknowledgement signal.

If the bus adapter 21 operating as the bus arbiter contemporaneously receives an asserted B INT REQ bus interrupt request signal on line 56 and an asserted B DMR bus direct memory request signal on line 55, it asserts one of the grant signals on lines 57 or 61 in accordance with a predetermined priority. In addition, if the bus adapter 21 operating as the bus arbiter requires a transfer over bus 11 as bus master, it may initiate a transfer whenever the B SACK bus selection acknowledgement signal is not asserted.

Structure And Operation Of Bus Adapter 21

1. General Description

With this background, the structure and operation of bus adapter 21 in subsystem 10 (FIG. 1) will now be described in detail in connection with FIG. 3. With reference to FIG. 3, bus adapter 21 includes two general transfer paths, one comprising a master transfer path 70, and the other a slave transfer path 71. The master transfer path 70 is used for both read and write transfer operations. The slave transfer path 71 is used for transfers initiated by another subsystem 10 through its bus adapter 21 over system bus 11, to transfer information to or from the memory 17 of the subsystem including this bus adapter 21. Both the master transfer path 70 and the slave transfer path 71 are used for both read and write transfer operations.

The master transfer path 70 includes a set of master local bus transceivers 72 connected to the LDAL local data/address lines 30 and master DAL data/address lines 73 to transfer signals between LDAL local data/address lines 30 and master DAL data/address lines 73 under control of a master control circuit 74. The master DAL data/address lines 73 are also connected to an address store and decode circuit 75, a data buffer 76, a set of control and status registers 77, an interprocessor communications register 78, a map cache 80, and a set of master system bus transceivers 81. The master control circuit 74 is also connected to the control lines of local bus 15, which, as shown in FIG. 2A, comprise all of the lines of the local bus 15 except for the LDAL (31:0) local data/address lines 30 and controls the transfer of information signals, that is, L DAT local data signals and L ADRS local address signals between the master DAL data/address lines 73 in response to the control signals on the control lines of the local bus 15.

The slave transfer path 71 includes a set of slave local bus transceivers 82 connected to the LDAL (31:0) local data/address lines 30 and slave DAL data/address lines 83 to transfer signals between LDAL (31:0) local data/address lines 30 and slave DAL data/address lines 83 under control of a slave local bus control circuit 84. The slave DAL data/address lines 83 are also connected to a read data buffer 85, two write data buffers, identified as an "A" write data buffer 86 and a "B" write data buffer 87, the interprocessor communications register 78 and a set of slave system bus transceivers 90. The slave control circuit 84 is also connected to the control lines of local bus 15, which, as shown in FIG. 2A, comprise all of the lines of the local bus 15 except for the LDAL (31:0) local data/address lines 30 and, under control of the master control circuit 74, controls the transfer of information signals, that is, L DAT local data signals and L ADRS local address signals between the master DAL data/address lines 73. In addition, the slave local bus control circuit 84, in response to S ADRS system address signals from the system bus 11, which are received through transceivers 90, enables an address translation and store circuit 91 to perform an address translation from the system address represented by the S ADRS system address signals to generate L ADRS local address signals representing the local address. The translation is performed using address translation information stored in the map cache 80 or in memory 17 as described below.

The transceivers 81 and 90 are controlled by a slave system bus control circuit 92 which receives and generates the system bus information transfer control signals on lines 51 through 54 (FIG. 2B). The slave system bus control circuit 92 enables information to be transferred to or from the transceivers 81 and 90 over the system bus 11 under control of the master control circuit 74. In addition, a system bus arbitration circuit 93 receives the S BUS ARB system bus arbitration signals on lines 55 through 57, 60 and 61 and an AUX auxiliary signal and performs an arbitration operation over the system bus 11, as described above, in response to control signals from the master control circuit. In response to a successful arbitration over the system bus 11, the arbitration circuit notifies the master control circuit that the bus adapter may perform a transfer over the system bus 11, and the master control circuit enables the slave system bus control circuit to initiate the information transfer.

Each bus adapter 21 receives an AUX auxiliary signal which is used to identify the bus adapter whose system bus arbitration circuit operates as the bus arbiter of the system bus 11. The AUX auxiliary signal to the bus adapter 21 of one subsystem 10 is negated to enable that bus adapter 21 to be the arbiter of system bus 11. The AUX auxiliary signals to the bus adapters 21 of the other subsystems 10 are asserted so that they are not bus arbiter of the system bus 11.

2. Data Structures

A. Local Bus Address Space

Figure 3:
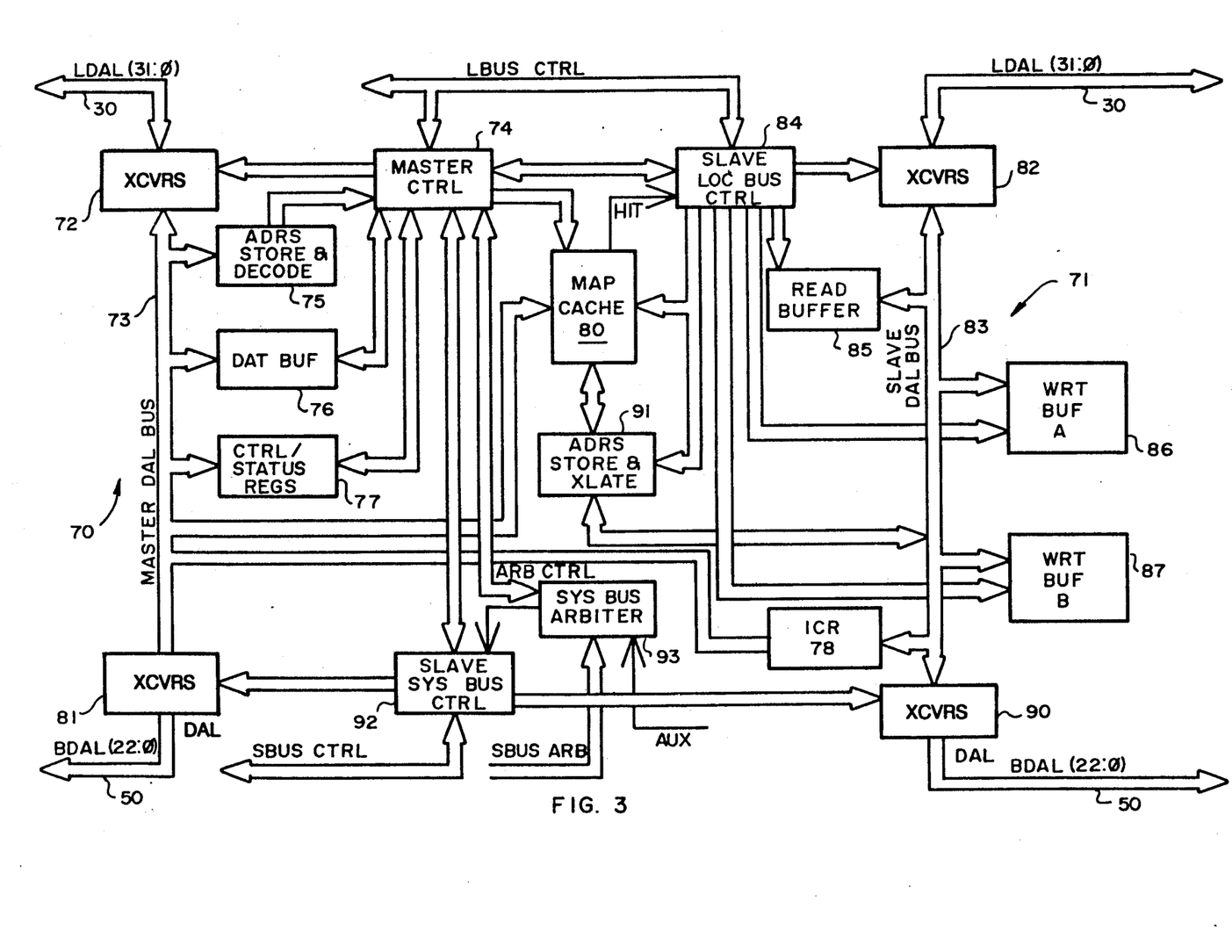
FIG. 3 is a functional block diagram of a bus adapter which is used to transfer information between a local bus and a system bus depicted in FIG. 2.
Figure 4A:
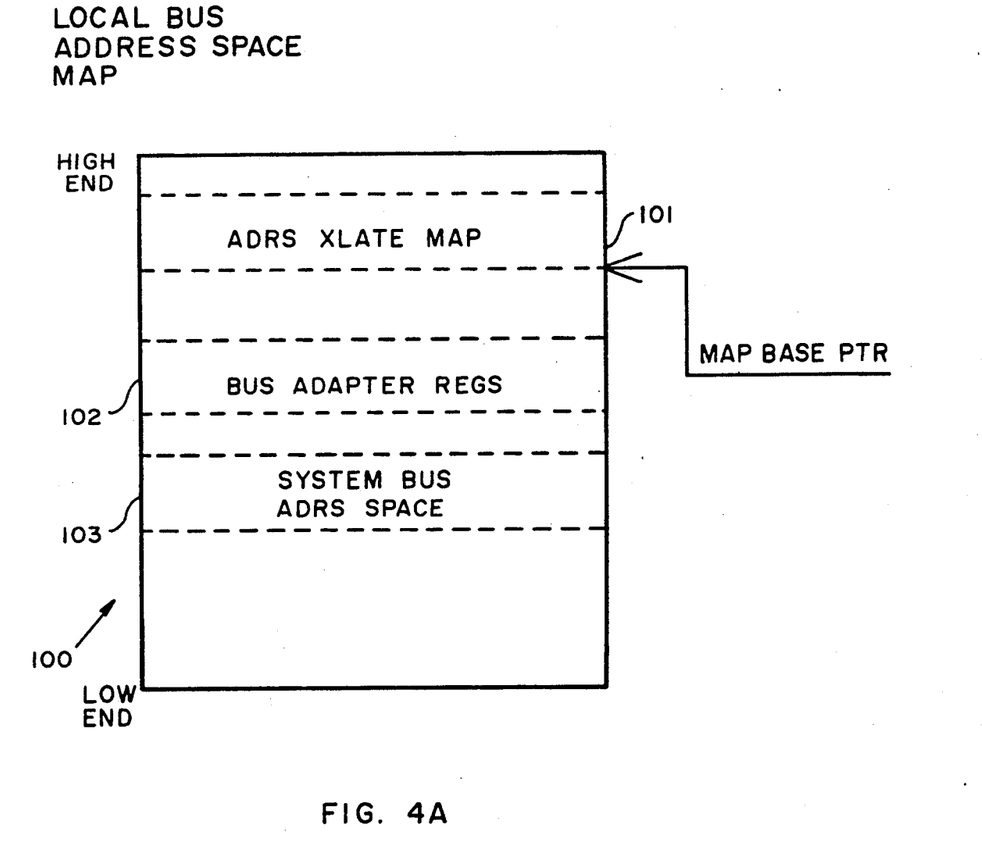

FIGS. 4A through 4D-5 depict several data structures which are helpful in understanding the operation of the bus adapter 21 depicted in FIG. 3. In particular, FIG. 4A depicts a map of the local bus address space 100, which is defined by the sequential addresses defined, in turn, by the L ADRS local address signals transmitted over the LDAL (31:0) local data/address lines 30, particularly showing the portions of the local bus address space associated with the bus adapter. The local bus address space 100 includes an address translation map 101 which is physically stored in the memory 17 at locations pointed to by the contents of a map base register 120 (described below in connection with FIG. 4D-1) which identifies the base of the address translation map 101 in memory 17. The translation map 101 in memory 17 is accessed either directly by CPU 13 or by another CPU 13 from subsystem 10 through bus adapters 21. The CPU 13 in a subsystem 10 can access map 101 by addressing locations which adapter 21 decodes from registers 102, and adapter 21 performs the operation to memory 17 area 101.

The address translation map 101 includes a plurality of entries each of which stores the high order portion of addresses in the local bus address space along with a valid flag which indicates whether the entry can be used. Briefly, in translating system bus addresses identified by S ADRS system address signals, the address store and translation circuit 91 uses the high-order portion of the S ADRS system address signals to identify an entry in the address translation map 101. Specifically, the high-order portion of the system address identified by the S ADRS system address signals comprises an offset, from the map base identified by the contents of the map base register, into the address translation map 101. The identified entry in the translation map 101 contains the high order portion of the corresponding memory address in memory 17. If the entry' valid flag indicates that the entry can be used in an address translation, the address store and translation circuit 91 then concatenates the low order portion of the system bus address identified by the S ADRS system address signals to the high order portion of the local address from the address translation map 101 to form the complete local address.

A second portion of the local bus address space in the map 100 associated with the bus adapter 21 is portion 102, which comprises the portion of the local bus address space which identifies the interprocessor communications register 78 (FIG. 3), and the control and status registers 77, all of which will be described in detail in connection with FIGS. 4C and 4D-1 through 4D-5. The central processor unit 13 (FIG. 1) may load information into, or read the contents of, the interprocessor communications register 78 or control and status registers 77 by initiating a transfer operation, as described above in connection with FIG. 2A, over the local bus 15 using the appropriate address in portion 102 in the local bus address space 100.

Finally, the local bus address space also includes a system bus address portion 103. If a unit attached to local bus 15 operating as local bus master transmits L ADRS local bus address signals in this range, the bus adapter 21 initiates a transfer over the system bus 11. Essentially, the high order portion of the local bus address, which identifies the local bus address as being in portion 103, enables the bus adapter to perform a transfer over system bus 11, and the low order portion of the local bus address constitutes the system bus address used by the bus adapter in the transfer.

The remaining portions of the local bus address space in the map depicted in FIG. 4A are used for other information storage as is conventional in the art.

B. Map Cache 80

Figure 4B:
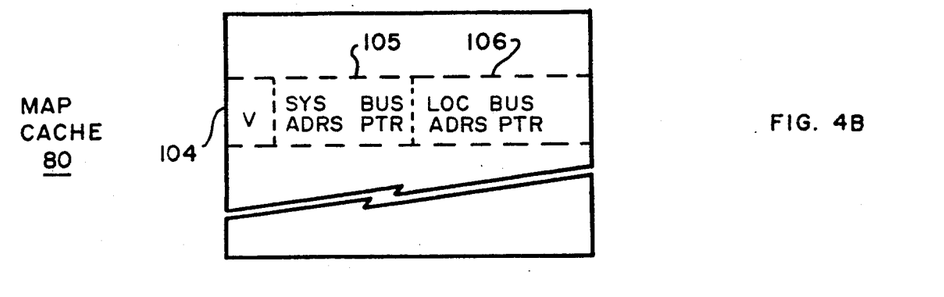

The map cache 80 includes a content-addressable memory including a plurality of entries, one of which is depicted in detail in FIG. 4B. With reference to FIG. 4B, an entry in the map cache 80 includes a valid flag 104, which indicates that the contents of the entry may be used in an address translation, a field 105 which receives a system bus address pointer, and a field 106 which contains a local bus address pointer. The system bus address pointer in field 105 contains the high order portion of the system bus address which corresponds to the high order portion of the local bus address pointer stored in field 106. Map cache 80 constitutes a cache of the address translation map 101 (FIG. 4A) used by the bus adapter 21, and the contents of field 105 comprises the offset value into the address translation map 101 which provides the value contained in field 106. In operation, the address store and translation circuit 91 presents the map cache 80 with the high order portion of the system bus address received from system bus 11, and, if that corresponds to the contents of field 105 in one of the entries in the map cache, the map cache provides the contents of field 106 from that entry if the valid flag 104 in the entry is set. If the valid flag of the entry is not set, or if the high order portion of the system bus address does not correspond to the contents of field 105 in any entry in the map cache 30, the master control circuit 74 is notified, which enables bus adapter 21 to obtain the corresponding entry in the address translation map 101 (FIG. 4A) and use it in the translation if that entry's valid flag is in an appropriate condition.

C. Interprocessor Communications Register 78

The interprocessor communications register 78 in each bus adapter 21 enables the bus adapter's central processor unit 13 and central processor units 13 of other subsystems 10 to control the operation of the bus adapters in connection with interrupt requests, local memory access and also enables the subsystem 10 whose bus adapter 21 controls arbitration of the system bus 11 to control continued operation of the central processor units of the other subsystems 10 in the system. The interprocessor communications register 78 (FIG. 2) can be accessed, that is, written or read, either by the central processor unit 13 in the bus adapter's subsystem 10 over local bus 15 through master transfer path 70, or by the central processor unit 13 in any other subsystem 10 in the system over system bus 11 through slave transfer path 71.

Figure 4C:
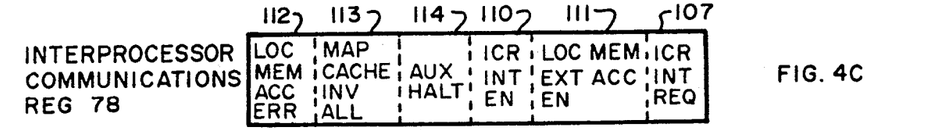
Figure 4D:
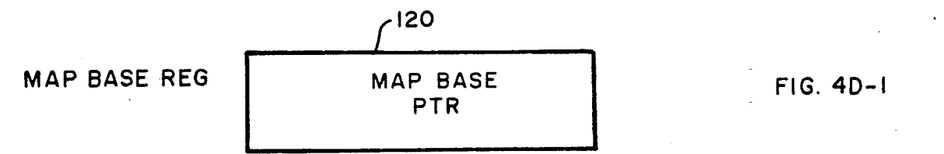

The interprocessor communications register includes a number of flags, which are depicted in detail in FIG. 4C. With reference to FIG. 4C, the interprocessor communications register includes an ICR INT REQ interprocessor communications register interrupt request flag 107 which can be set by a central processor unit 13 in another subsystem 10. If an ICR INT EN interprocessor communications register interrupt enable flag 110 is set, in response to the setting of the ICR INT REQ interprocessor communications register interrupt request flag 107, the master control circuit 74 initiates an interrupt operation over local bus 15. The ICR INT EN interprocessor communications register interrupt enable flag 110 is normally set or reset by the central processor unit 13 in the subsystem 10 in which the bus adapter 21 is connected.

The interprocessor communications register 78 also includes an LOC MEMORY EXT ACC EN local memory external access enable flag 111 which, when set, enables the slave section 71 to perform a transfer between system bus 11 and local bus 15 for any subsystem 10. If an error occurs during the transfer, such as if the NOT LOC MEMORY REF not local memory reference signal is asserted on line 37, the bus adapter 21 sets a LOC MEMORY ACC ERR local memory access error flag 112. If the LOC MEMORY ACC ERR local memory access error flag 112 is set, the bus adapter 21 asserts an MEMORY ERR memory error signal on line 42 (FIG. 2A).

A MAP CACHE INV ALL map cache invalidate all flag 113 enables the master control circuit 74 to clear the valid flags 104 (FIG. 4B) in all of the entries in the map cache 80. This normally occurs when this or another subsystem alters the contents of the address translation map 101 (FIG. 4A) to prevent the bus adapter from using the contents of possibly stale entries in the map cache 80.

Finally, an AUX HALT auxiliary halt flag 114, when set enables the master control circuit 74 to transmit an asserted HALT signal on line 45 (FIG. 2A) if the bus adapter's AUX auxiliary signal is asserted to halt the central processor unit 13. The AUX HALT auxiliary halt flag can be conditioned by the bus adapter 21 which operates as the arbiter, that is, whose AUX auxiliary signal is not asserted.

D. Control And Status Registers 77

Five control and status registers, which can be accessed by the central processor unit 13 in which the bus adapter 21 is connected and which are depicted in FIGS. 4D-1 through 4D-5, control the operation of the bus adapter 21. A map base register 120, depicted in FIG. 4D-1, contains the map base pointer which, as described above in connection with FIG. 4A, points to the base of the address translation map 101 in the local bus address space.

Figure 4D:
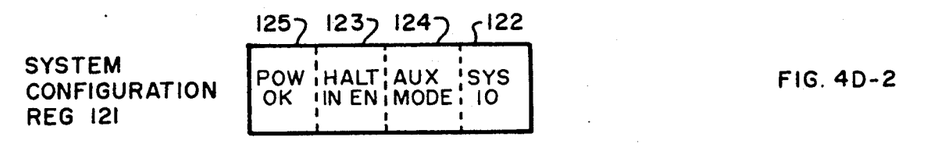

A system configuration register 121, depicted in FIG. 4D-2, contains configuration information used by the bus adapter 21. In particular, the system configuration register 121 includes a system identification field 122 which contains a binary-encoded identification number. The contents of the system configuration register 121 effectively identifies each bus adapter 21 in the address space defined by S ADRS system bus address signals and distinguishes it from other bus adapters which are connected to the system bus 11 in the system bus address space.

The system configuration register also 121 includes a HALT IN EN halt in enable flag 123 which can be conditioned by the bus adapter's central processor unit 13. If the HALT IN EN halt in enable flag 123 is set, the bus adapter 21, and specifically the master control circuit 74, is enabled to assert the HALT signal over line 45 of local bus 15 when the AUX HALT flag 114 in interprocessor communications register 78 is set as described above.

The system configuration register 121 also includes an AUX MODE auxiliary mode flag 124 and a POW OK power ok flag 125, both of which can be read by the central processor unit 13 in the subsystem in which the bus adapter 21 is connected. The AUX MODE auxiliary mode flag reflects the condition of the AUX auxiliary signal received by system bus arbitration circuit 93 (FIG. 3) to indicate whether the bus adapter 21 is the arbiter of system bus 11. The POW OK power ok flag 125 reflects the status of the power supply which powers the bus adapter 21.

Figure 4D:
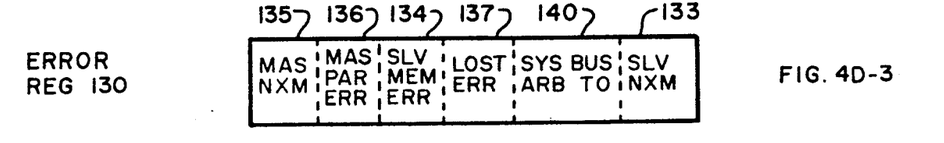
Figure 4D:
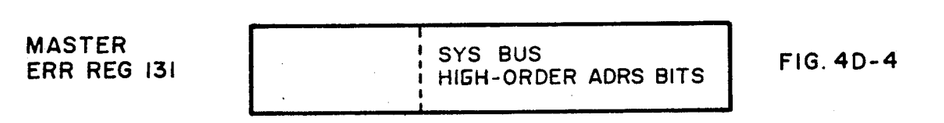
Figure 4D:
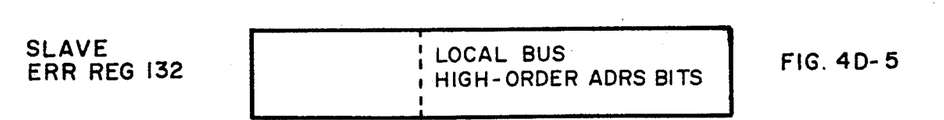

The control and status registers 77 also includes three registers which are used for reporting errors, namely an error register 130, a master error register 131 and a slave error register 132. The error register 130 includes two flags, namely a SLV NXM slave non-existent memory flag 133 and a SLV MEMORY ERR slave memory error flag 134 which are used to indicate errors in the slave portion 71. The SLV NXM slave non-existent memory flag 133 is set by the master control circuit 74 when, in response to a transfer over local bus 15, the NOT LOC MEMORY REF not local memory reference signal is asserted over line 37. The SLV MEMORY ERR slave memory error flag 134 is set by the master control circuit if, during a transfer over local bus 15, the ERR error signal is asserted on line 35, rather than the RDY ready signal. When either of flags 133 or 134 is set, the high-order portion of the local bus address is loaded into the slave error register 132 to allow the central processor unit 13 to perform error recovery operations.

The error register 130 also includes two flags, namely, a MAS NXM master non-existent memory flag 135 and a MAS PAR ERR master parity error flag 136 which indicate the error status of transfers over system bus 11 through master transfer path 70 when the bus adapter 21 is operating as master of system bus 11. The MAS NXM master non-existent memory flag 135 is set by the master control circuit 74 if a non-existent memory indication occurs in a transfer over system bus 11. This occurs if the B RPLY bus reply signal is not asserted within a selected timeout period. The MAS PAR ERR master parity error flag is set by the master control circuit 74 when a parity error in a transfer over system bus 11. When either of flags 135 or 136 is set, the high-order portion of the system bus address is loaded into the master error register 131 to allow the central processor unit 13 to perform error recovery operations.

Finally, the error register 130 also includes two other error flags, namely, a LOST ERR lost error flag 137 and a SYS BUS ARB TO system bus arbitration time out error flag 140. The LOST ERR lost error flag 137 is set if an address from a second error is loaded into the slave error register 132 before the central processor unit 13 can retrieve the contents of the register resulting from a prior error. The SYS BUS ARB TO system bus arbitration time out error flag 140 is set by the master control circuit 74 if the bus adapter 21 is unable to obtain mastership of system bus 11 within a predetermined amount of time after the master control circuit enables the system bus arbitration circuit 93 to arbitrate for the system bus 11.

If any of the flags in the error register 130 are set, the master control circuit 74 performs an interrupt operation over local bus 15 to enable the central processor unit 13 to perform error recovery operations.

3. Operation

With this background, the operation of bus adapter 21 will be explained in connection with four types of transfers, namely, (A) write transfers initiated over local bus 15, (B) read transfers initiated over local bus 15, (C) write transfers received by the bus adapter 21 initiated over system bus 11, and (D) read transfers received by the bus adapter 21 initiated over system bus 11.

It will be appreciated that operations initiated by one bus adapter 21 over system bus 11 result in corresponding operations in the same or another bus adapter 21 in response thereto. In particular, a write transfer over local bus 15 enables the bus adapter 21 connected thereto to perform a transfer through its master transfer path 70 and initiate a write operation over system bus 11. In response to a write transfer over system bus 11, the same or another bus adapter initiates a transfer through the slave transfer path 71 which results in a write transfer over local bus 15. Similarly, a read transfer over local bus 15 enables the bus adapter 21 connected thereto to perform a transfer through its master transfer path 70 and initiate a read operation over system bus 11. In response to a read transfer over system bus 11, the same or another bus adapter initiates a transfer through the slave transfer path 71 which results in a read transfer over local bus 15.

A. Operation Initiated By Write Transfers Over Local Bus 15

In response to an asserted ADRS STR address strobe signal on line 32 (FIG. 2A), the master control circuit 74 (FIG. 3) enables the transceivers 72 to couple the L ADRS local address signals on L DAL (31:0) local data/address lines 30 onto master DAL bus 73 and to the address store and decode circuit 75. The address store and decode circuit 75 decodes the L ADRS local address signals to determine if it identifies a location in the address translation map 101, a location in register space 102 or a location in the system bus address space 103. If the L ADRS local address signals do not identify any location in any of spaces 101, 102 or 103, the transfer is ignored by bus adapter 21.

However, if the L ADRS local address signals do identify a location in address translation map 101, register space 102 or system bus address space 103, the bus adapter 21 engages in a transfer. In particular, the master control circuit 74 receives the TR TYPE transfer type signals over lines 31 and determines the type of transfer. If the TR TYPE transfer type signal indicate a write operation, when the DATA STR data strobe signal is asserted on line 33, the master control circuit 74 enables the transceivers 73 to couple the data signals on L DAL local data/address lines 30 onto master DAL bus 73. The next operations depend on the location identified by the L ADRS local address signals.

If the address decoded by the address store and decode circuit 75 identifies a location in the address translation map 101, the master control circuit 74 enables the data signals to be latched in the data buffer 76 and the slave local bus control circuit 84 to assert the RDY ready signal on line 34 or ERR error signal on line 35 to complete the transfer. Thereafter, the master control circuit enables the slave transfer path 71 to engage in a transfer over local bus 30 to transfer the data latched in the data buffer 76 to the location in the address translation map 101.

On the other hand, if the address decoded by the address store and decode circuit 75 identifies a register in control and status registers 77 or interprocessor communications register 78, the master control circuit 74 enables the signals on master DAL bus 73 to be loaded into the identified register and the slave local bus control circuit 84 to assert the appropriate RDY ready signal on line 34 or ERR error signal on line 35 to complete the transfer.

Finally, if the address decoded by the address store and decode circuit 74 identifies a location in system bus address space 103, the master control circuit 74 initiates a transfer over the system bus 11. In particular, the master control circuit enables the system bus arbitration circuit 93 to perform an arbitration operation. When the system bus arbitration circuit obtains mastership of system bus 11, it notifies the master control circuit 74, which, in turn, enables the slave system bus control circuit 92 to perform an operation over the system bus 11. The master control circuit 74 enables the address store and decode circuit 75 to couple the S ADRS system address signals onto master DAL bus 73. The slave system bus control circuit 92 then enables the transceivers 81 to couple the S ADRS system address signals onto BDAL system data address/lines 50. Contemporaneously, the slave system bus control circuit 92 asserts the B SYNC bus synchronization signal on line 51 (FIG. 2B).

The master control circuit 74 then enables the transfer of the write data from the data buffer 76 over the system bus 11. Specifically, the master control circuit 74 enables the data buffer 76 to couple a word of data onto the master DAL bus 73. The master control circuit 74 then enables the slave system bus control circuit 92 to condition the transceivers 81 to couple the signals on the master DAL bus 73 onto the BDAL system data-/address lines 50 and to assert the B DOUT bus data output signal on line 52 (FIG. 52). On receiving the asserted B RPLY bus reply signal on line 54, the slave system bus control circuit 92 notifies the master control circuit 74.

It will be appreciated that, since a data word transmitted over the local bus 15 and latched in the data buffer 76 has thirty-two bits and a data word transmitted over system bus 11 has sixteen bits, a second transfer will normally be required over system bus 11 to transfer the entire contents of the data buffer 76. If the data buffer 76 has additional data words to transmit over system bus 11, then normally the block transfer mode, described above, is used until all words have been transmitted, at which time the master control circuit 74 enables the slave system bus control 92 to negate the B SYNC bus synchronization signal on line 51 to complete the transfer.

B. Operations Initiated By Read Transfers Over Local Bus 15

In response to an asserted ADRS STR address strobe signal on line 32 (FIG. 2A), the master control circuit 74 (FIG. 3) enables the transceivers 72 to couple the L ADRS local address signals on L DAL (31:0) local data/address lines 30 onto master DAL bus 73 and to the address store and decode circuit 75. The address store and decode circuit 75 decodes the L ADRS local address signals to determine if it identifies a location in the address translation map 101, a location in register space 102 or a location in the system bus address space 103. If the L ADRS local address signals do not identify any location in any of spaces 101, 102 or 103, the transfer is ignored by bus adapter 21.

However, if the L ADRS local address signals do identify a location in address translation map 101, register space 102 or system bus address space 103, the address store and decode circuit 75 enables the master control circuit 74 to, in turn, enable other elements of bus adapter 21 to engage in a transfer. In particular, the master control circuit 74 receives the TR TYPE transfer type signals over lines 31 and determines the type of transfer. If the TR TYPE transfer type signals indicate a read operation, when the DATA STR data strobe signal is asserted on line 33, the master control circuit 74, the next operations depend on the location identified by the L ADRS local address signals.

If the address decoded by the address store and decode circuit 75 identifies a location in the address translation map 101, the master control circuit 74 enables the slave local bus control circuit to transmit an asserted RETRY signal on line 36 of local bus 15. The master control circuit then initiates a read operation over local bus 15 to retrieve from the memory 17 (FIG. 1) the contents of the location in the address translation map 101. When the memory 17 returns the contents as L DAT local data signals over L DAL local data/address lines 30, the master control circuit 74 enables transceivers 72 to couple the L DAT local data signals onto master DAL bus 73 and the data buffer 76 to latch them. When the read operation is again performed, the master control circuit enables the contents of the data buffer to be coupled onto the master DAL bus 73, and transmitted through transceivers 72 onto the L DAL (31:0) local data/address lines 30. In addition, the master control circuit 74 enables the slave local bus control circuit 84 to assert the RDY ready signal on line 34 or ERR signal on line 35 to complete the transfer.

On the other hand, if the address decoded by the address store and decode circuit 75 identifies a register in control and status registers 77 or the interprocessor communications register 78, the master control circuit enables signals representing the contents of the identified register to be coupled onto the master DAL bus 73 and transmitted through transceivers 72 onto the L DAL (31:0) local data/address lines 30. In addition, the master control circuit 74 enables the slave local bus control circuit 84 to assert the appropriate RDY ready signal on line 34 or ERR error signal on line 35 to complete the transfer.

Finally, if the address decoded by the address store and decode circuit 74 identifies a location in system bus address space 103, the master control circuit 74 initiates a transfer over the system bus 11. In particular, the master control circuit enables the system bus arbitration circuit 93 to perform an arbitration operation. When the system bus arbitration circuit obtains mastership of system bus 11, it notifies the master control circuit 74, which, in turn, enables the slave system bus control circuit 92 to perform an operation over the system bus 11. The master control circuit 74 enables the address store and decode circuit 75 to couple the S ADRS system address signals portion of the address signals latched by the address store and control circuit 75 onto master DAL bus 73. The slave system bus control circuit 92 then enables the transceivers 81 to couple the S ADRS system address signals onto BDAL system data address/lines 50. Contemporaneously, the slave system bus control circuit 92 asserts the B SYNC bus synchronization signal on line 51 (FIG. 2B).

The master control circuit 74 then enables slave system bus control circuit 92 to transmit the B DIN bus data in signal and condition the transceivers 81 to couple the S DAT system data signals from BDAL (21:0) system data/address lines 50 onto master DAL bus 73. When the slave system bus control circuit 92 receives the asserted B RPLY bus reply signal on line 54, it notifies the master control circuit 74, which enables the data buffer 76 to latch the data signals on the bus 73. The master control circuit 74 then enables the slave system bus control circuit 92 to negate the B DIN bus data in signal on line 53.

If the data buffer 76 has latched sufficient data, as determined by the TR TYPE signals received when the transfer was initiated, the master control circuit also enables the slave system bus control circuit to negate the B SYNC bus synchronization signal to indicate the end of the transfer over system bus 11. On the other hand, if more data is required, the master control circuit 74 enables the slave system bus control circuit 92 to again assert the B DIN bus data in signal on line 53. As a result, the previously addressed slave unit on system bus 11 returns additional data as S DAT system data signals and again asserts the B RPLY bus reply signal on line 54. This continues until the master control circuit 74 determines that sufficient data has been retrieved, at which point it enables the slave system bus control circuit 92 to negate the B SYNC bus synchronization signal on line 51, indicating the end of the transfer over system bus 11.

The master control circuit also enables the data in data buffer 11 to be transmitted onto the master DAL bus 73 and conditions the transceivers 72 to couple them as L DAT local data signals over L DAL (31:0) local data/address lines 30. Thereafter, the master control circuit 74 enables the slave local bus control circuit to assert the RDY signal on line 34 or ERR error signal on line 35, as appropriate, and the master unit on local bus 15 negates the DATA STR data strobe signal on line 33 and the ADRS STR address strobe signal on line 32.

C. Operations Initiated By Write Transfers Over System Bus 11

In response to an asserted B SYNC bus synchronization signal over line 51 (FIG. 2B), the slave system bus control circuit 92 notifies the master control circuit of a transfer over system bus 11. The master control circuit 74 enables the slave system bus control circuit to condition transceivers 90 to couple the S ADRS system address signals from BDAL (21:0) system data/address lines 50 onto slave DAL bus 83. The master control circuit 74 then enables slave local bus control circuit to, in turn, enable the address store and translate circuit 91 to latch the S ADRS system address signals on slave DAL bus 83 and determine whether the transfer is intended for the bus adapter's interprocessor communications register 78, using the contents of the system identification field 122 in the system configuration register 121 (FIG. 4D-2), or a location in address space 100 (FIG. 4A), such as in memory 17. If the transfer is not intended for the interprocessor communications register 78, the slave local bus control circuit 84 enables the address store and translation circuit 91 to generate L ADRS local bus address signals using the contents of the map cache 80 and address translation map 101, as described above. If no valid address can be generated, which can occur if there is no valid entry in the map cache 80 or in the address translation map 101, then the transfer over system bus 11 is not intended for this bus adapter 21.

If the B DOUT signal on line 52 is next asserted, the operation is a write operation. When the B DOUT signal is asserted, the slave bus control circuit 92 notifies the master control circuit, which, if the LOC MEMORY EXT ACC EN local memory external access enable flag 111 (FIG. 4C) is set, again enables the slave system bus control circuit to condition the transceivers 90 to couple the S DAT system data signals comprising a system data word from the BDAL (21:0) system data/address lines 50 onto the slave DAL bus 83. If the LOC MEMORY EXT ACC EN local memory external access enable flag 111 is not set, the bus adapter 21 ignores the transfer. Assuming the LOC MEMORY EXT ACC EN local memory external access enable flag 111 is set, the master control circuit 74 then enables the slave local bus control circuit 84 to, in turn, enable the S DAT system data signals to be latched in write buffer A 86. The master control circuit 74 then enables the slave system bus control circuit 92 to transmit an asserted B RPLY bus reply signal on line 54. When the B SYNC bus synchronization signal is then negated on line 51, the slave system bus control circuit 92 negates the B RPLY bus reply signal on line 54.

If additional system data words are to be received during a write operation, they are received in the same way and stored in the write buffer 86. When the write buffer A 86 is filled, the system data words are loaded into the write buffer B 87.

At the end of a transfer, or after write buffer A 86 has been filled, if the address store and translate circuit 91 determined that the transfer was intended for the subsystem in which the bus adapter 21 is connected, the master control circuit 74 performs an arbitration operation to enable the bus adapter 21 to obtain mastership of local bus 15.

When the bus adapter 21 becomes master of local bus 15, the master control circuit 74 enables the slave local bus control circuit 84 to perform a write operation over local bus 15 to transfer the contents of write buffer A 86, using the translated address produced by the address store and translation circuit 91. That is, the slave local bus control circuit 84 generates TR TYPE transfer type signals and couples them onto line 31, and enables the address store and translation circuit 91 to transmit the translated L ADRS local bus address signals onto the slave DAL bus 83. The slave local bus control circuit 84 conditions the transceivers 82 to couple the L ADRS local bus address signals from the slave DAL bus 83 onto the L DAL (31:0) local data/address lines 30. The slave local bus control circuit 84 then asserts the ADRS STR address strobe signal on line 32.

The slave local bus control circuit 84 then enables the write buffer A 86 to couple L DAT local data signals representing a local bus data word onto the slave DAL bus 83. The transceivers 82 are conditioned to couple the L DAT local data signals onto L DAL (31:0) local data/address lines 30, and the slave local bus control circuit 84 asserts the DATA STR data strobe signal on line 33. In response to the receipt of an asserted RDY ready signal on line 34 or ERR error signal on line 35, the slave local bus control circuit 84 terminates the transfer, disables the transceivers 82 and negates the ADRS STR address strobe signal and DATA STR data strobe signal.

If there are additional data words to be transferred, either in the write buffer A 86 or in the write buffer B 87, the slave local bus control circuit enables another transfer to occur as described above. In this transfer, the slave local bus control circuit 84 first enables the address store and translate circuit to generate an incremented system bus address and perform a translation operation as described above. It will be appreciated that, if the increment of the low order portion of the system address does not also cause an increment of the high order portion, the address store and translation circuit 91 need only increment the translated address since the low order portion is invariant under translation. On the other hand, if the increment of the low order portion of the system address does cause an increment of the high order portion, the address store and translation circuit 91 must use the incremented high order portion of the system address to enable the retrieval, from either the map cache 80 or the address translation map 101, of the high order portion of the local address.

It will be appreciated that, if in a write transfer initiated from system bus 11, write buffer B 87 becomes filled, if all of the data in write buffer A 86 has been transferred over the local bus 15, additional data from the system bus 11 may be stored in the write buffer A 86, and after that is filled, in write buffer B 87 if it is emptied over the local bus 15. Thus, in a block transfer over system bus 11, after one buffer 86 or 87 has become full the other buffer is available to buffer data from the system bus 11 while the first is being emptied over the local bus 15.

D. Operations Initiated By Read Transfers Over System Bus 11

In response to an asserted B SYNC bus synchronization signal over line 51 (FIG. 2B), the slave system bus control circuit 92 notifies the master control circuit of a transfer over system bus 11. The master control circuit 74 enables the slave system bus control circuit to condition transceivers 90 to couple the S ADRS system address signals from BDAL (21:0) system data/address lines 50 onto slave DAL bus 83. The master control circuit 74 then enables slave local bus control circuit to, in turn, enable the address store and translate circuit 91 to latch the S ADRS system address signals on slave DAL bus 83 and determine whether the transfer is intended to be with the bus adapter's interprocessor communications register 78, using the contents of the system identification field 122 in the system configuration register 121 (FIG. 4D-2), or a location in memory 17.

If the B DIN bus data in signal on line 52 is next asserted, the operation is a read operation. If the transfer is intended to be from the interprocessor communications register 78 of the bus adapter 21, the master control circuit 74 enables the contents of the interprocessor communications register 78 to be coupled onto the slave DAL bus 83. The master control circuit 74 then enables the slave system bus control circuit 92 to condition the transceivers 90 to couple the signals on the slave DAL bus 83 onto the BDAL (21:0) system data/address lines 50, and to assert the B RPLY bus reply signal on line 54.

If the transfer is not intended to be with the interprocessor communications register 78, the slave local bus control circuit 84 enables the address store and translation circuit 91 to generate L ADRS local bus address signals using the contents of the contents of the map cache 80 and address translation map 101, as described above. If no valid address can be generated, which can occur if there is no valid entry in the map cache 80 or in the address translation map 101, then the transfer over system bus 11 is not intended for this bus adapter 21.

When the B DIN bus data in signal is asserted in a transfer not with the interprocessor communications register 78, the slave bus control circuit 92 notifies the master control circuit, which if the LOC MEMORY EXT ACC EN local memory external access enable flag 111 (FIG. 4C) is set, performs an arbitration operation over local bus 15 to enable the bus adapter 21 to become bus master. If the LOC MEMORY EXT ACC EN local memory external access enable flag 111 is not set, the bus adapter 21 ignores the transfer. Assuming the LOC MEMORY EXT ACC EN local memory external access enable flag 111 is set, the master control circuit performs, when the bus adapter 21 becomes bus master, the master control circuit 74 enables the slave local bus control circuit 84 to perform a read operation over local bus 15 to retrieve data for transmission over the system bus 11.

In the read operation over local bus 15, in response to the receipt of an asserted RDY signal on line 34, the slave local bus control circuit 84 conditions the transceivers 82 to couple the L DAT local data signals on L DAL (31:0) local data/address lines 30 onto the slave DAL bus 83, and enables them to be latched in the read buffer 85. The slave local bus control circuit then enables the address store and translation circuit 91 to increment the system address which was received from system bus 11 and initiates another read operation over local bus 15 in case the read transfer turns out to be a block transfer. The additional read data is also stored in the read buffer 85.

After a first data word is stored in the read buffer 85, the slave local bus control circuit 84 notifies the master control circuit 74, which, in turn, enables the slave system bus control circuit 92 to transmit data stored in the read buffer 85 over the system bus 11. After receiving the asserted B DIN bus data in signal on line 53, the slave system bus control circuit enables the read buffer to transmit a system bus data word onto the slave DAL bus 83, conditions the transceivers 90 to couple the signals on slave DAL bus 83 onto BDAL (21:0) system data/address lines 50 and asserts the B RPLY bus reply signal on line 54. After the B DIN bus data in signal is negated, the slave system bus control circuit 92 negates the B RPLY bus reply signal on line 54 to terminate the transfer of the data word. If the B SYNC bus synchronization signal is then negated to terminate the transfer, the additional data in the read buffer 85 is discarded.

On the other hand, if the B SYNCH bus synchronization signal is not negated, but instead the B DIN bus data in signal is again asserted to indicate a block transfer, the slave system bus control circuit 92 notifies the master control circuit 74 to enable another data word to be transmitted by the read buffer onto slave DAL bus 83. In addition, if there is room in read buffer 85, the master control circuit enables the slave local bus control circuit 84 to retrieve further data over local bus 15 for storage in the read buffer 85. The slave system bus control circuit maintains the transceivers 90 conditioned to couple the data word transmitted by the read buffer 85 onto the BDAL (21:0) system data/address lines 50 and transmits the asserted B RPLY bus reply signal as described above. This continues until the system bus master unit negates the B SYNC bus synchronization signal on line 51.

4. Summary

It will be appreciated that the bus adapter 21 provides an efficient mechanism for transferring data between a system bus and a local bus in a digital data processing system comprising multiple subsystems, and which allows the various subsystems to interrupt other subsystems and notify them of errors in connection with the transfers.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An adapter comprising:
   A. a transfer arrangement for performing transfers of information items between a system bus and a local bus, an information item including a data item and having an address on the system bus and an address on the local bus that is possibly different from said system bus address; and
   B. a transfer control portion including:
      i. a cache memory for caching address translation information for use during translation between the system bus address of an information item and the local bus address of said information item;
      ii. an address translation portion for performing translations between said system bus addresses and said local bus addresses of information items transferred between said system bus and said local bus by said transfer arrangement, said address translation portion accessing said cache memory in performing at least some of said address translations; and
      iii. a control arrangement for controlling transfers by said transfer arrangement, said control arrangement enabling said transfer translation portion to perform said translations.

2. An adapter as defined in claim 1 in which said transfer control portion further includes a fetch portion, responsive to the cache memory indicating that it is not currently caching address translation information for an address, for initiating a fetch operation over said local bus to retrieve address translation information for use by said address translation portion, said cache memory caching the address translation information as it is retrieved.

3. An adapter as defined in claim 1 wherein:
   A. said transfer arrangement includes:
      i. a master transfer path for performing transfers of said information items between said local bus and said system bus that are initiated over said local bus; and
      ii. a slave transfer path for performing transfers of said information items between said local bus and said system bus that are initiated over said system bus;
   B. said transfer control portion further including a master control portion for controlling said master transfer path and a slave transfer portion for controlling said slave transfer path, said master control portion further controlling said slave transfer path.

4. An adapter as defined in claim 3 wherein:
   A. said master transfer path includes:
      i. an address decode portion for receiving address information from said master transfer path;
      ii. a data buffer for storing data;
   B. said master transfer control portion for enabling said address decode portion to receive address information from said master transfer path originating from said local bus, and for enabling said data buffer to store data, said master transfer control portion enabling said address translation portion to perform a translation operation to translate an address received by said address decode portion for use in initiating a transfer over said system bus.

5. An adapter as defined in claim 4 wherein said slave transfer path includes:
   A. a write buffer system for storing information from said system bus for transfer over said local bus;
   B. a read buffer for storing information from said local bus for transfer over said system bus; and
   C. said transfer control portion includes a slave transfer control portion for controlling storage of information within said write buffer system and said read buffer system.

6. An adapter as defined in claim 5 in which said write buffer system includes two buffers, said transfer control portion selectively enabling each buffer to store information received from said system bus.

7. An adapter as defined in claim 1 wherein said transfer control portion further includes an arbiter for controlling information transfers by said slave transfer path and said master transfer path over said system bus in response to selected conditions over said system bus.

8. A digital data processing system comprising:
   A. a local bus for transferring local information items, a local information item including a local address;
   B. a central processing unit for initiating transfers of local information items over said local bus;
   C. a local memory responsive to transfers of local information items over said local bus;
   D. a system bus for transferring system information items, a system information item including a system address;
   E. an adapter comprising:
      i. a transfer arrangement, including a slave transfer path for receiving system information items from said system bus and in response thereto initiating transfers of local information items over said local bus, the local address of a local information item initiated in response to a system information item possibly being different from the system address of said system information item,
      ii. a transfer control portion including:
         a. a cache memory for caching address translation information for use during said transfers of said local information items over said local bus in response to said received system information items;

b. an address translation portion for performing a translation between the system address of a system information item and the local address of the local information item transferred over said local bus in response to said system information item by said transfer arrangement, said address translation portion accessing said cache memory in performing said address translation; and c. a control arrangement for controlling transfers by said transfer arrangement, said control arrangement enabling said address translation portion to perform said translation.

9. A system as defined in claim 8 in which the local information item includes a local address and a local data item.

10. A system as defined in claim 8 in which the system information item includes a system address and a system data item.

11. A system as defined in claim 8 in which said transfer control portion further includes a fetch portion, responsive to the cache memory indicating that it is not currently caching address translation information for an address, for initiating a fetch operation over said local bus to retrieve address translation information for use by said address translation portion, said cache memory caching the address translation information as it is retrieved.

12. A system as defined in claim 8 wherein:
A. said transfer arrangement includes a master transfer path for receiving local information items from said local bus and in response thereto transmitting system information items over said system bus;
B. said transfer control portion further including a master control portion for controlling said master transfer path and a slave transfer portion for controlling said slave transfer path, said master control portion further controlling said slave transfer path.

13. A system as defined in claim 12 wherein:
A. said master transfer path includes:
   i. an address decode portion for receiving address information from said master transfer path,
   ii. a data buffer for storing data;
B. said master transfer control portion for enabling said address decode portion to receive address information from said master transfer path originating from said local bus, and for enabling said data buffer to store data, said master transfer control portion enabling said address translation portion to perform a translation operation to translate an address received by said address decode portion for use in initiating a transfer over said system bus.

14. A system as defined in claim 12 wherein said slave transfer path includes:
A. a write buffer system for storing information from said system bus for transfer over said local bus;
B. a read buffer for storing information from said local bus for transfer over said system bus; and
C. said transfer control portion includes a slave transfer control portion for controlling storage of information within said write buffer system and said read buffer system.

15. A system as defined in claim 14 in which said write buffer system includes two buffers, said transfer control portion selectively enabling said buffer to store information received from said system bus.

16. A system as defined in claim 8 wherein said transfer control portion further includes an arbiter for controlling information transfers by said slave transfer path and said master transfer path over said system bus in response to selected conditions over said system bus.

17. A digital data processing system comprising:
A. a system bus for transferring system information items, a system information item including a system address;
B. a digital data processing subsystem for initiating transfers of system information items over said system bus;
C. a local bus for transferring local information items, a local information item including a local address;
D. an adapter comprising:
   i. a transfer arrangement, including a slave transfer path for receiving system information items from said system bus and in response thereto initiating transfers of local information items over said local bus, the local address of a local information item initiated in response to a system information item possibly being different from the system address of said system information item,
   ii. a transfer control portion including:
      a. a cache memory for caching address translation information for use during said transfers of local information items over said local bus in response to said received system information items;
      b. an address translation portion for performing a translation between the system address of a system information item and the local address of the local information item transferred over said local bus in response to said system information item by said transfer arrangement, said address translation portion accessing said cache memory in performing said address translation; and
      c. a control arrangement for controlling transfers by said transfer arrangement, said control arrangement enabling said address translation portion to perform said translation.

18. A system as defined in claim 17 in which the local information item includes a local address and a local data item.

19. A system as defined in claim 17 in which the system information item includes a system address and a system data item.

20. A system as defined in claim 17 in which said transfer control portion further includes a fetch portion, responsive to the cache memory indicating that it is not currently caching address translation information for an address, for initiating a fetch operation over said local bus to retrieve address translation information for use by said address translation portion, said cache memory caching the address translation information as it is retrieved.

21. A system as defined in claim 17 wherein:
A. said transfer arrangement includes a master transfer path for receiving local information items from said local bus and in response thereto transmitting system information items over said system bus;
B. said transfer control portion further including a master control portion for controlling said master transfer path and a slave transfer portion for controlling said slave transfer path, said master control portion further controlling said slave transfer path.

22. A system as defined in claim 21 wherein:

A. said master transfer path includes:
  i. an address decode portion for receiving address information from said master transfer path,
  ii. a data buffer for storing data;
B. said master transfer control portion for enabling said address decode portion to receive address information from said master transfer path originating from said local bus, and for enabling said data buffer to store data, said master transfer control portion enabling said address translation portion to perform a translation operation to translate an address received by said address decode portion for use in initiating a transfer over said system bus.

23. A system as defined in claim 21 wherein said slave transfer path includes:
  A. a write buffer system for storing information from said system bus for transfer over said local bus;
  B. a read buffer for storing information from said local bus for transfer over said system bus; and
  C. said transfer control portion includes a slave transfer control portion for controlling storage of information within said write buffer system and said read buffer system.

24. A system as defined in claim 23 in which said writer buffer system includes two buffers, said transfer control portion selectively enabling each buffer to store information received from said system bus.

25. A system as defined in claim 17 wherein said transfer control portion further includes an arbiter for controlling information transfers by said slave transfer path and said master transfer path over said system bus in response to selected conditions over said system bus.

26. A digital data processing system comprising:
A. a system bus for transferring system information items, a system information item including a system address;
B. a plurality of digital data processing subsystems for initiating transfers of system information items over said system bus, said digital data processing subsystems each comprising:
  i. a local bus for transferring local information items, a local information item including a local address;
  ii. a central processing unit for initiating transfers of local information items over said local bus;
  iii. a local memory responsive to transfers of local information items over said local bus;
  iv. an adapter comprising:
    a. a transfer arrangement, including a slave transfer path for receiving system information items from said system bus and in response thereto initiating transfers of local information items over said local bus, the local address of a local information item initiated in response to a system information item possibly being different from the system address of said system information item,
    b. a transfer control portion including:
      I. a cache memory for caching address translation information for use during said transfers of said local information items over said local bus in response to said received system information items;
      II. an address translation portion for performing a translation between the system address of a system information item and the local bus in response to said system information item by said transfer arrangement, said address translation portion accessing said cache memory in performing said address translation; and
      III. a control arrangement for controlling transfers by said transfer arrangement, said control arrangement enabling said address translation portion to perform said translation.

27. A system as defined in claim 26 in which the local information item includes a local address and a local data item.

28. A system as defined in claim 26 in which the system information item includes a system address and a system data item.

29. A system as defined in claim 26 in which said transfer control portion further includes a fetch portion, responsive to the cache memory indicating that it is not currently caching address translation information for an address, for initiating a fetch operation over said local bus to retrieve address translation information for use by said address translation portion, said cache memory caching the address translation information as it is retrieved.

30. A system as defined in claim 26 wherein:
A. said transfer arrangement includes a master transfer path for receiving local information items from said local bus and in response thereto transmitting system information items over said system bus;
B. said transfer control portion further including a master control portion for controlling said master transfer path and a slave transfer portion for controlling said slave transfer path, said master control portion further controlling said slave transfer path.

31. A system as defined in claim 30 wherein:
A. said master transfer path includes:
  i. an address decode portion for receiving address information from said master transfer path,
  ii. a data buffer for storing data;
B. said master transfer control portion for enabling said address decode portion to receive address information from said master transfer path originating from said local bus, and for enabling said data buffer to store data, said master transfer control portion enabling said address translation portion to perform a translation operation to translate an address received by said address decode portion for use in initiating a transfer over said system bus.

32. A system as defined in claim 30 wherein said slave transfer path includes:
A. a write buffer system for storing information from said system bus for transfer over said local bus;
B. a read buffer for storing information from said local bus for transfer over said system bus; and
C. said transfer control portion includes a slave transfer control portion for controlling storage of information within said write buffer system and said read buffer system.

33. A system as defined in claim 32 in which said write buffer system includes two buffers, said transfer control portion selectively enabling each buffer to store information received from said system bus.

34. A system as defined in claim 23 wherein said transfer control portion further includes an arbiter for controlling information transfers by said slave transfer path and said master transfer path over said system bus in response to selected conditions over said system bus.

* * * * *

UNITED STATES PATENT AND TRADEMARK OFFICE
CERTIFICATE OF CORRECTION

PATENT NO. : 5,029,074

DATED : July 2, 1991

INVENTOR(S) : Maskas et al.

It is certified that error appears in the above-identified patent and that said Letters Patent are hereby corrected as shown below:

```
ON THE TITLE PAGE:
In the title; insert --DATA-- after "DIGITAL"

Column 1 insert --DATA-- after "DIGITAL"

Column 10, line 61; "entry valid" should be --entry's
     valid--
```

Signed and Sealed this

Thirteenth Day of April, 1993

Attest:

STEPHEN G. KUNIN

*Attesting Officer*     *Acting Commissioner of Patents and Trademarks*